United States Patent
Wu et al.

(10) Patent No.: US 6,810,436 B2
(45) Date of Patent: Oct. 26, 2004

(54) WIRELESS RECEIVING DEVICE AND METHOD JOINTLY USED BY COMPUTER PERIPHERALS

(75) Inventors: Kun Chan Wu, Chung Ho (TW); Wen Sheng Liao, Chung Ho (TW); Chao Wu Chien, Chung Ho (TW); Chung Ping Chi, Chung Ho (TW)

(73) Assignee: Topseed Technology Corp., Taipei Hsien (TW)

( * ) Notice: Subject to any disclaimer, the term of this patent is extended or adjusted under 35 U.S.C. 154(b) by 312 days.

(21) Appl. No.: 09/984,477

(22) Filed: Oct. 30, 2001

(65) Prior Publication Data

US 2003/0084210 A1 May 1, 2003

(51) Int. Cl.$^7$ .............................................. G06F 3/00
(52) U.S. Cl. ................................ 710/8; 410/9; 410/12; 410/14; 410/62
(58) Field of Search ............................ 710/8, 9, 12, 14, 710/62; 455/66; 446/175; 700/52; 707/1; 380/270; 370/338

(56) References Cited

U.S. PATENT DOCUMENTS 5,881,366 A * 3/1999 Bodenmann et al. ...... 455/41.2

2002/0187722 A1 * 12/2002 Fong et al. ................. 446/175
2002/0188589 A1 * 12/2002 Salmenkaita et al. .......... 707/1
2003/0033032 A1 * 2/2003 Lind et al. .................... 700/52
2003/0043771 A1 * 3/2003 Mizutani et al. ........... 370/338
2003/0048905 A1 * 3/2003 Gehring et al. ............. 380/270

FOREIGN PATENT DOCUMENTS

WO    WO 01/18662    * 3/2003    ........... G06F/13/38

* cited by examiner

Primary Examiner—Jeffrey Gaffin
Assistant Examiner—Justin Knapp
(74) Attorney, Agent, or Firm—Rosenberg, Klein & Lee

(57) ABSTRACT

The present invention provides a wireless receiving device jointly used by computer peripherals and a method thereof. The wireless receiving device comprises a wireless receiving circuit, a micro-processing circuit, and an interface circuit. The micro-processing circuit can receive wireless signals emitted by wireless emitting devices of different computer peripherals via the wireless receiving circuit, and has a learning procedure. The learning procedure can be activated to let the micro-processing circuit memorize and lock on a specific wireless emitting device. The signal processed by the micro-processing circuit is then transferred to a computer via the interface circuit.

2 Claims, 4 Drawing Sheets

WIRELESS RECEIVING DEVICE AND METHOD JOINTLY USED BY COMPUTER PERIPHERALS

FIELD OF THE INVENTION

The present invention relates to a wireless receiving device jointly used by computer peripherals and a method thereof and, more particularly, to a wireless receiving device capable of receiving signals of wireless emitting devices of different computer peripherals and having also learning function.

BACKGROUND OF THE INVENTION

A wireless device jointly used as a computer peripheral such as a wireless mouse, a wireless keyboard, a wireless joystick, and so on achieves transmission and reception of wireless signals between it and a computer via an emitting end and a receiving end to facilitate operations of a user.

Although the above conventional wireless device can save much operational space ambient a computer, once a user uses various kinds of wireless devices simultaneously, because each wireless device requires an emitting end and a receiving end, the operational space ambient the computer will be overcrowded, and the wireless devices will easily interfere one another. Moreover, only a limited number of the above wireless devices can be connected to connection ports of computer so that so many wireless devices cannot be used simultaneously.

Accordingly, the above wireless device has inconvenience and drawbacks in practical use. The present invention aims to resolve the problems in the prior art.

SUMMARY OF THE INVENTION

The primary object of the present invention is to provide a wireless receiving device jointly used by computer peripherals and a method thereof, whereby wireless signals emitted by various kinds of different wireless computer peripherals can be received.

Another object of the present invention is to provide a wireless receiving device jointly used by computer peripherals and a method thereof, which wireless receiving device has learning function to memorize and lock on a specific wireless device.

Yet another object of the present invention is to provide a wireless receiving device jointly used by computer peripherals and a method thereof, which wireless receiving device can be disposed on a motherboard inside a computer to reduce the number of occupied connection ports of computer.

To achieve the above objects, the present invention provides a wireless receiving device jointly used by computer peripherals and a method thereof, which wireless receiving device comprises a wireless receiving circuit, a micro-processing circuit, and an interface circuit. The wireless receiving circuit is used to receive a wireless signal emitted by one or more wireless emitting device. The micro-processing circuit is used to identify and decode the wireless signal, and output a control signal. The interface circuit is used to receive the control signal, and output it to a computer. The micro-processing circuit has learning function. The learning procedure can be activated to let the micro-processing circuit memorize and lock on a specific wireless emitting device.

The various objects and advantages of the present invention will be more readily understood from the following detailed description when read in conjunction with the appended drawings, in which:

DETAILED DESCRIPTION OF THE PREFERRED EMBODIMENTS

Figure 1:
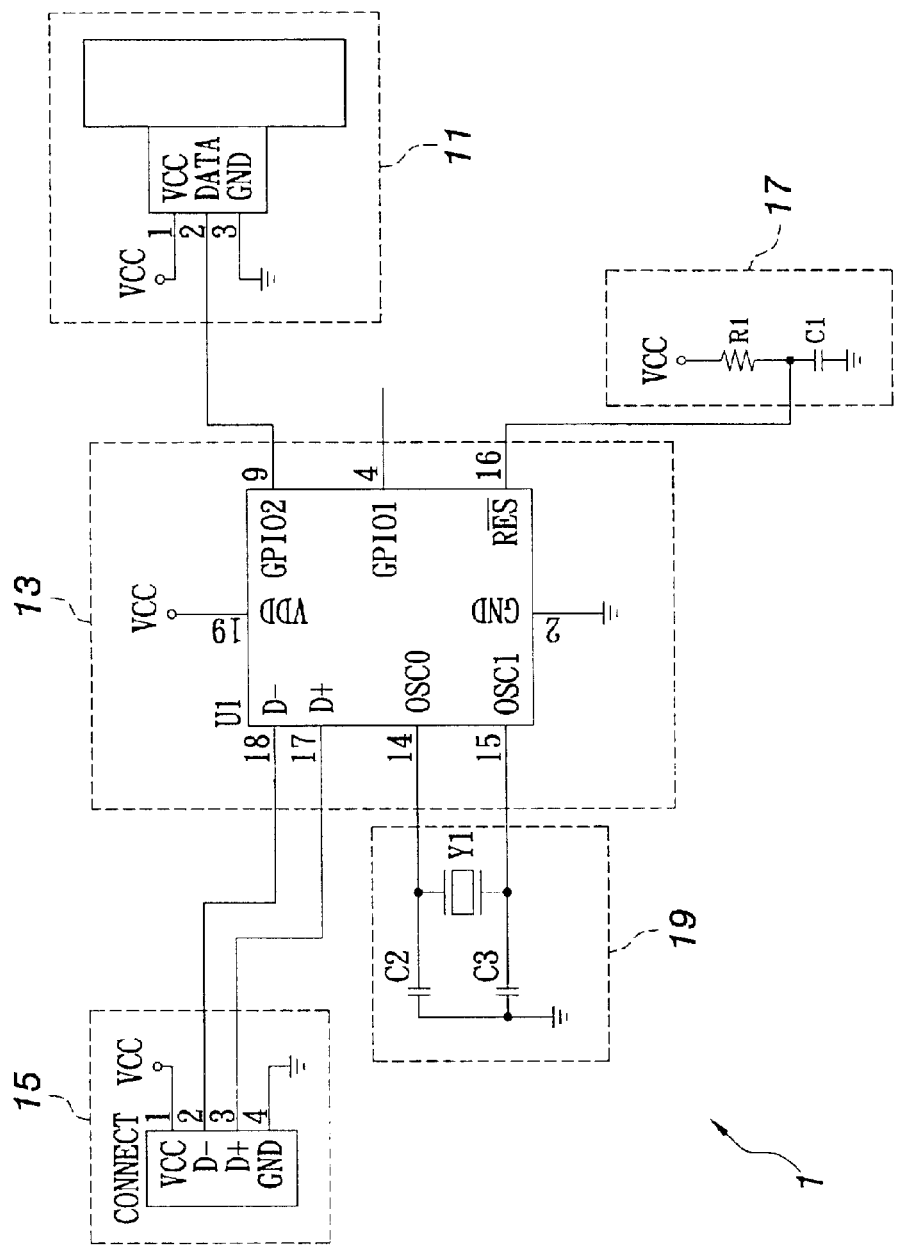
FIG. 1 is a circuit diagram of a wireless emitting device of the present invention.

As shown in FIG. 1, the present invention provides a wireless receiving device jointly used by computer peripherals. The wireless receiving device 1 of the present invention can be used to receive wireless signals emitted by wireless emitting devices of different computer peripherals, and has learning function. The wireless receiving device 1 comprises a wireless receiving circuit 11, a micro-processing circuit 13, an interface circuit 15, a reset circuit 17, and an oscillation circuit 19.

The wireless receiving circuit 11 is used to receive wireless signals emitted by wireless emitting devices. The wireless receiving circuit 12 adopts the frequency shift keying (FSK) modulation technique to enhance anti-noise capability. The wireless emitting device can be a wireless keyboard 2, a wireless mouse 3, a wireless remote controller 4 (shown in FIG. 4), or another wireless emitting device.

The present invention will be illustrated with the wireless keyboard 2, the wireless mouse 3, and the wireless remote controller 4 as examples of wireless emitting devices. Each wireless emitting device has an ID code representing its identity, and the ID code is composed of a product code and an identity code. In other words, different kinds of wireless emitting devices are distinguished according to different product codes, and different wireless emitting devices of the same kind are distinguished according to different identity codes.

The micro-processing circuit 13 is used to identify and decode the received wireless signal to distinguish the kind of the wireless emitting device and the transmitted message, and convert them into a control signal. The wireless signal is composed of the ID code and data. The data is used to represent action message emitted by the wireless emitting device.

The interface circuit 15 is connected between the output end of the micro-processing circuit 13 and a computer, and is used to receive the control signal and then output it to the computer. The interface circuit 15 is connected to a transmission port conforming to the universal serial bus (USB) protocol of a computer.

The reset circuit 17 is composed of a resistor R1 and a capacitor C1, and is connected to the input end of the micro-processing circuit 13. The reset circuit 16 is used to initiate the micro-processing circuit 13.

The oscillation circuit 19 is composed of capacitors C2 and C3 and a quartz crystal Y1, and is connected to the input end of the micro-processing circuit 13. The oscillation circuit 17 is used to provide the working frequency.

The above wireless receiving device 1 can be used to receive wireless signals emitted by various kinds of different wireless emitting devices. The learning procedure can be activated to memorize and lock on a device under the situation that there are several wireless emitting devices of the same kind. For instance, if there are mice A, B, and C, and the wireless receiving device 1 only receives message emitted by the mouse A currently, in order to switch to the state of only receiving message of the mouse B, it is only necessary let the mouse B function and the mice A and C not function. After the wireless receiving circuit 12 receives a wireless signal emitted by the mouse B, the learning procedure will let the micro-processing circuit 13 memorize the ID code representing the mouse B and lock on it. That is, the wireless receiving device 1 only receives message emitted by the mouse B afterwards. Therefore, using this learning procedure, different users can have their individual mice. It is only necessary to activate the learning procedure to let the mouse in the hand function.

Figure 2:
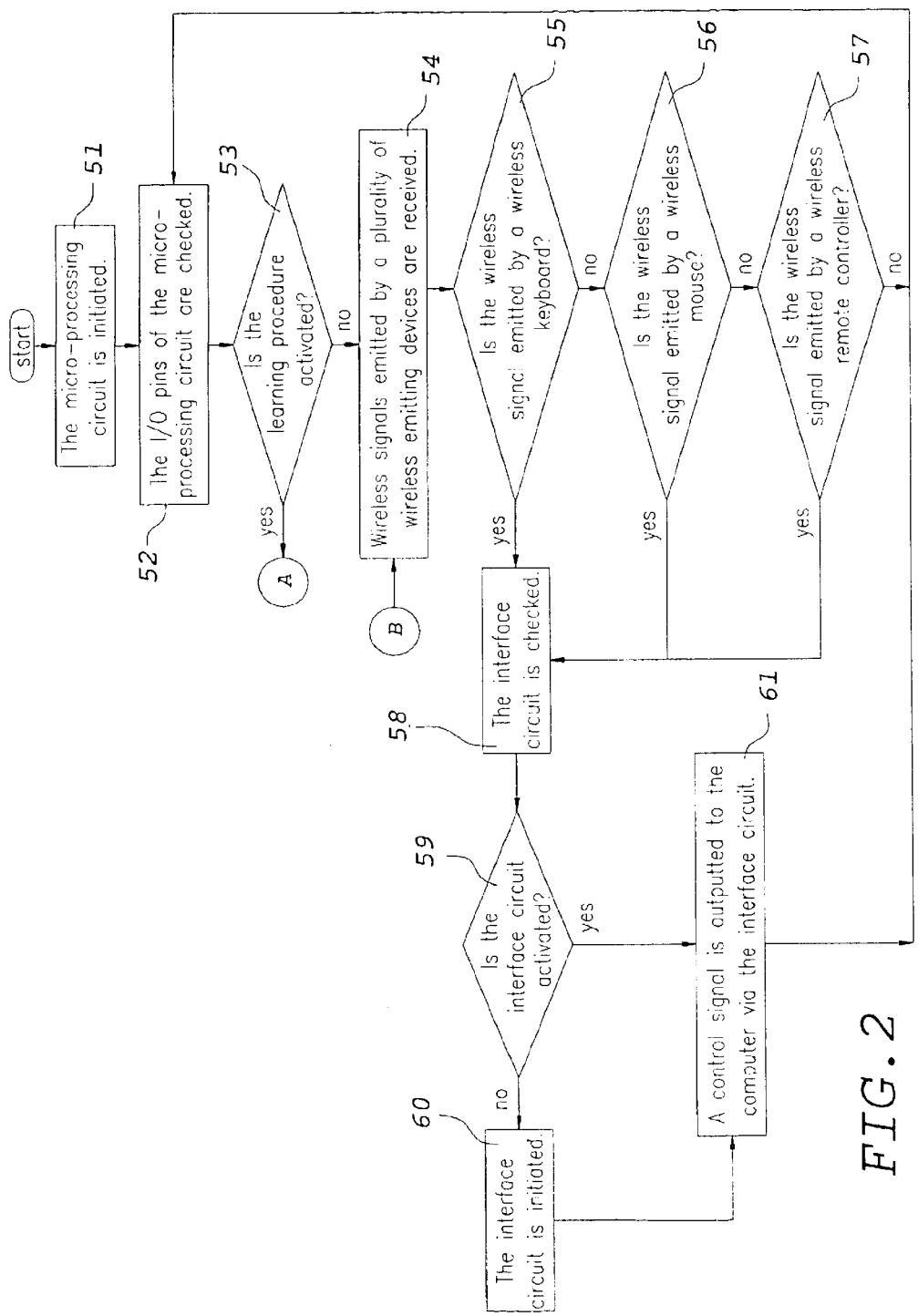
FIG. 2 is an operational flowchart of a wireless receiving method of the present invention.
Figure 3:
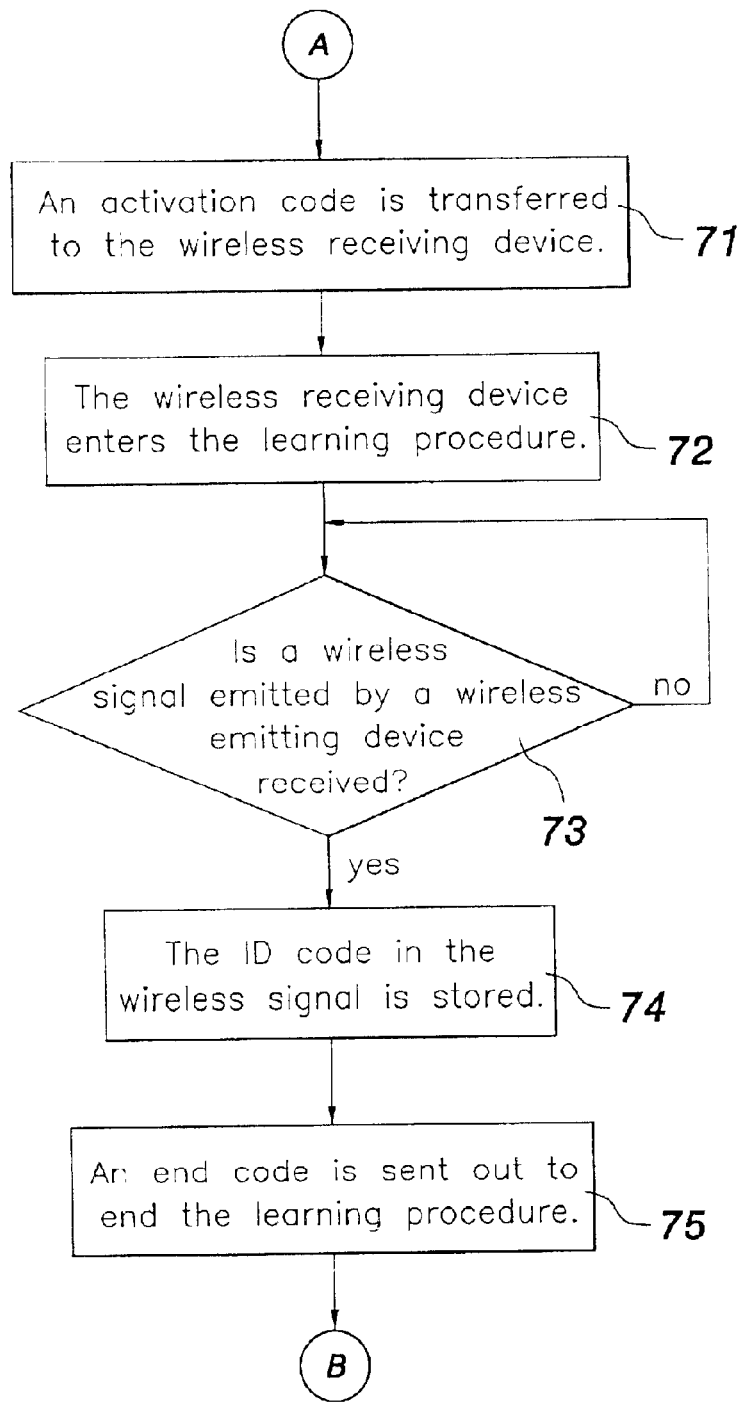
FIG. 3 is a continued diagram of the flowchart shown in FIG. 2.

As shown in FIGS. 2 and 3, a wireless receiving method jointly used by computer peripherals of the present invention comprises the following steps.

Step 51: The micro-processing circuit 13 is initiated;

Step 52: The I/O pins of the micro-processing circuit 13 are checked;

Step 53: Whether the learning procedure is activated is judged. If the answer is positive, Step 71 is jumped to; otherwise, Step 54 is jumped to;

Step 54: Wireless signals emitted by a plurality of wireless emitting devices are received;

Step 55: The micro-processing circuit 13 judges whether the wireless signal is emitted by a wireless keyboard 2. If the answer is positive, data in the wireless signal is decoded into a control signal, and Step 58 is jumped to; otherwise, Step 56 is jumped to;

Step 56: The micro-processing circuit 13 judges whether the wireless signal is emitted by a wireless mouse 3. If the answer is positive, data in the wireless signal is decoded into a control signal, and Step 58 is jumped to; otherwise, Step 57 is jumped to;

Step 57: The micro-processing circuit 13 judges whether the wireless signal is emitted by a wireless remote controller 4. If the answer is positive, data in the wireless signal is decoded into a control signal, and Step 58 is jumped to; otherwise, Step 52 is jumped back to;

Step 58: The interface circuit 15 is checked;

Step 59: Whether the interface circuit 15 is activated is judged. If the answer is positive, Step 61 is jumped to; otherwise, Step 60 is jumped to;

Step 60: The interface circuit 15 is initiated;

Step 61: The control signal is outputted to a computer via the interface circuit 15, and Step 52 is jumped back to.

Step 71: An activation code is transferred to the wireless receiving device 1;

Step 72: The wireless receiving device enters a learning procedure;

Step 73: Whether the wireless receiving device 1 receives a wireless signal emitted by a wireless emitting device is judges. If the answer is positive, Step 74 is jumped to; otherwise, Step 73 is repeated;

Step 74: The ID code in the wireless signal is stored;

Step 75: An end code is sent out to end the learning procedure, and Step 54 is jumped back to.

Additionally, the above wireless emitting device can be the wireless keyboard 2, the wireless mouse 3, or the wireless remote controller 4. The interface circuit 15 in the Steps 57 to 60 is the USB.

Figure 4:
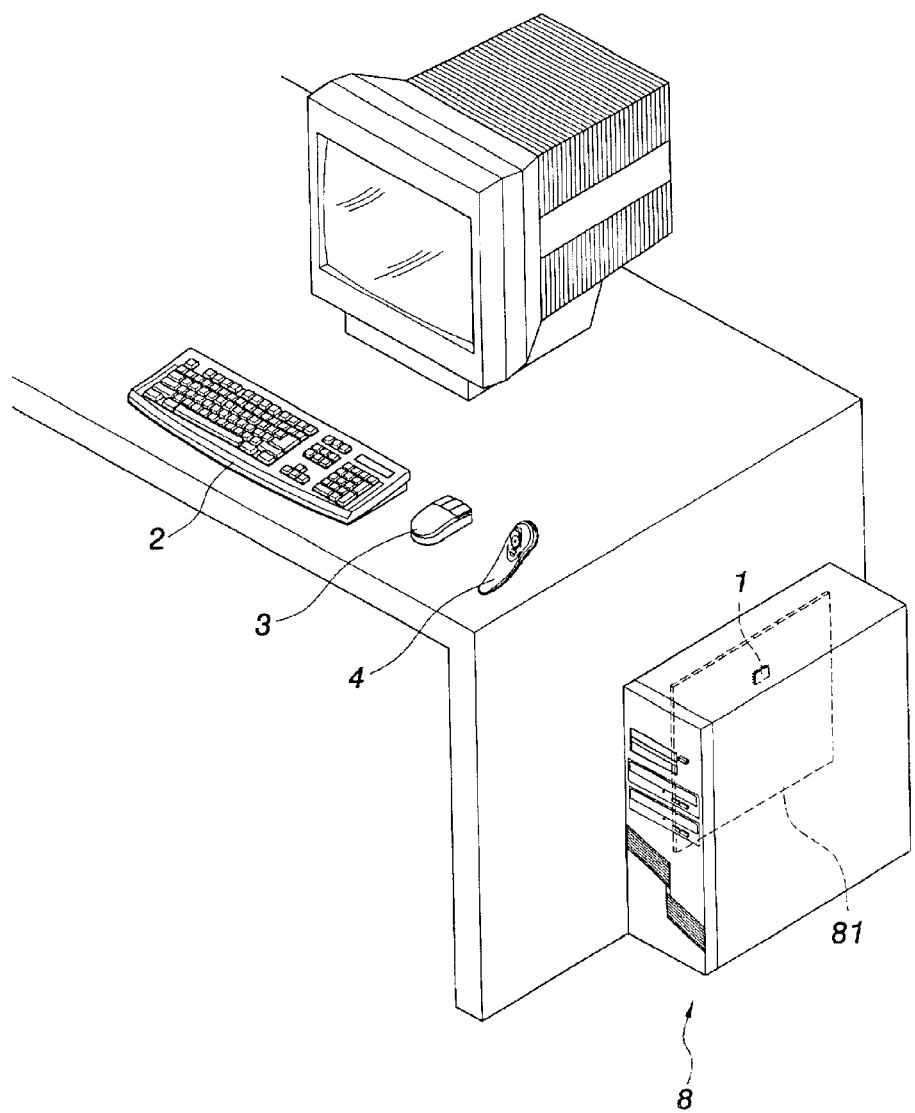
FIG. 4 is a diagram showing that the present invention is used to receive wireless signals of computer peripherals.

As shown in FIG. 4, when the present invention is to be used, the wireless receiving device 1 is electrically connected to a motherboard 81 inside a computer 8 via the interface circuit 15 (not shown). The wireless receiving device 1 can receive wireless signals emitted by the wireless keyboard 2, the wireless mouse 3, the wireless remote controller 4, or other wireless peripherals, and the operation is convenient. Therefore, the problems encountered in the conventional wireless device can be effectively resolved.

To sum up, the present invention provides a wireless receiving device jointly used by computer peripherals and a method thereof. The present invention has the following characteristics.

1. Wireless signals emitted by wireless emitting devices of different kinds of computer peripherals can be received.

2. The wireless receiving device has learning function to memorize and lock on a specific wireless emitting device.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

We claim:

1. A wireless receiving device jointly used by computer peripherals, comprising:

a wireless receiving circuit used to receive at least one wireless signal emitted by at least one of a plurality of wireless emitting devices;

a micro-processing circuit coupled to said wireless receiving circuit for identifying a source of said at least one wireless signal and decoding said at least one wireless signal if said at least one wireless signal includes an ID code for a recognized source, said micro-processing circuit outputting a control signal corresponding to said decoded wireless signal, a wireless signal being undecoded by said micro-processing circuit if an ID code thereof is from an unrecognized source and another wireless signal having an ID code of a recognized source is concurrently received, said micro-processing circuit entering a learning mode responsive to receiving only said wireless signal with said ID code of said unrecognized source, said micro-processing circuit storing said ID code of said unrecognized source to then identify said stored ID code for subsequently received wireless signals as being from said recognized source; and an interface circuit coupled to said micro-processing circuit for transferring said control signal to a computer.

2. A wireless receiving method jointly used by computer peripherals, comprising the steps of:

(a) initiating a micro-processing circuit;

(b) checking I/O pins of said micro-processing circuit;

(c) receiving a wireless signal from at least one computer peripheral;

(d) said micro-processing circuit judging whether said received wireless signal has an ID code of a recognized source, jumping to step (f) if said ID code is that of said recognized source, entering a learning procedure if said ID code is from an unrecognized source and a wireless signal from said recognized source is not concurrently received therewith;

(e) said micro-processing circuit storing said ID code from said unrecognized source for subsequently identifying said stored ID code as being from said recognized source;

(f) said micro-processing circuit decoding said received wireless signal into a control signal; and (g) transferring said control signal from an interface circuit to a computer.

* * * * *